US012764498B2

(12) United States Patent
Sharma et al.

(10) Patent No.: US 12,764,498 B2
(45) Date of Patent: Oct. 13, 2026

(54) DEVICE TRACKING SERVICE

(71) Applicant: AT&T Intellectual Property I, L.P., Atlanta, GA (US)

(72) Inventors: Vinay Sharma, Queens Village, NY (US); Yuan Ding, Plainsboro, NJ (US); Umut Akyol, Matawan, NJ (US); Lawrence Bakst, Verona, NJ (US); Pranith Dachepally, Savannah, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 283 days.

(21) Appl. No.: 18/738,171

(22) Filed: Jun. 10, 2024

(65) Prior Publication Data

US 2025/0380111 A1 Dec. 11, 2025

(51) Int. Cl.
*H04W 4/029* (2018.01)

(52) U.S. Cl.
CPC .................................. *H04W 4/029* (2018.02)

(58) Field of Classification Search
CPC .............................. H04W 4/029; H04W 4/027
See application file for complete search history.

(56) References Cited

U.S. PATENT DOCUMENTS 10,779,237 B2 * 9/2020 Herrmann ............... H04W 4/08
2016/0349351 A1 * 12/2016 Ludden ................. G01S 5/0294
2018/0077538 A1 * 3/2018 Matus ..................... H04W 4/40
2020/0174544 A1 * 6/2020 Wang ...................... G06F 1/329
2023/0078020 A1 * 3/2023 Chisu .................... H04W 76/19 370/331

* cited by examiner

*Primary Examiner* — Kenneth T Lam

(74) *Attorney, Agent, or Firm* — Guntin & Gust, PLC; Andrew Gust

(57) ABSTRACT

A device tracking service can obtain a call event data set defining call events associated with multiple UEs; obtain transit data and network topology data; identify two or more movements associated with the multiple UEs; determine if the UEs are moving in unison; and if so, publish a macrorecord to a device tracking log, the macrorecord including a count of the UEs, an average speed of the UEs, and a travel mode associated with the UEs. The operations further can include in response to a determination that the UEs are not moving in unison, updating the call event data set with information that can define a device identifier, a type of device, a travel mode, and a location associated with at least one of the UEs.

20 Claims, 8 Drawing Sheets

200

| Variable | Description |
|---|---|
| 202A MSISDN | Subscriber's MSISDN. Can be "0" in case of emergency attach or dynamic MSISDN |
| 202B IMSI | 15 digit number. Can be "0" in case of emergency attach. |
| 202C IMEI | 15/16 digits number |
| 202D APN | Access Point Name identifying the packet data network (PDN)that a mobile data user tried to attach, should be ims* |
| 202E QCI | Value should be 1 |
| 202F RAT | Radio Access Type: 0- UNKNOWN 1 - UTRAN (3G) ,2 - GERAN (2G),6 – EUTRAN (4G) |
| 202G Lac | 2G/3G Location Area Code. |
| 202H Sac | 3G Service Area Code. |
| 202I Ci | 2G Cell Identifier. |
| 202J Tac | 4G Tracking Area Code. |
| 202K Eci\|NCI | 4G\|5G Cell Identifier. |
| 202L Mcc | Cell Mobile Country code. |
| 202M Mnc | Cell Mobile Network code. |
| 202N Time of messages seen on probe interface | |
| 202O Call start time | |
| 202P Call End time | |
| 202Q RTT | Round trip time, can be "0" |
| 202R Packet/sec | Part of 5-tuple |

FIG. 2

300

| | Output Data Type 1: Microrecords |
|---|---|
| 302A | Subscriber' MSISDN, IMEI, IMSI |
| 302B | Type of device (Mobile Handset) |
| 302C | Subscriber's travel mode (Public: Bus/Rail, Private) |
| 302D | Average Subscriber's travel speed |
| 302E | Average Time duration Subscriber is travelling, during the call. |
| 302F | Subscriber's possible location in real time based on Cell IDs, Longitude, Latitude, in alignment with public transport travel map. |
| 302G | Possible level of noise - high, normal. |

FIG. 3A

304

| | Output Data type 2: Macrorecords |
|---|---|
| 306A | Count of subscribers making VoLTE call from a particular location. |
| 306B | Location updates of subscribers in real time. |
| 306C | Count of Subscribers making VoLTE call and travelling together |
| 306D | Travel mode |
| 306E | Average possible speed of those subscribers, most likely same. |
| 306F | Possible level of noise - high, normal, based on all other calls connected to same tower. |

FIG. 3B

DEVICE TRACKING SERVICE

BACKGROUND

With the proliferation of networked devices and the use thereof, tracking device locations and/or movements can be helpful (e.g., for network resource adjustment, management, orchestration, and the like). While individual devices may be trackable under some circumstances (e.g., using GPS and/or E911 technologies, or the like), tracking one or more devices during travel can be challenging, particularly when multiple devices travel simultaneously. In particular, managing network resources and/or resource availability can be a challenge for network operators and/or Internet service providers ("ISPs").

For example, if multiple mobile devices make calls while traveling together, managing handoffs and/or providing services at an agreed-upon quality of service ("QoS") level can be challenging due to difficulties in predicting what towers devices may next connect to, whether resources are or will still be needed and where, combinations thereof, or the like. Furthermore, meeting and/or exceeding QoS commitments can be important for customers and network operators and/or ISPs to reduce churn and/or customer satisfaction.

SUMMARY

The present disclosure is directed to a device tracking service. A server computer that hosts the device tracking service can obtain an initial instance of a call event data set, which can correspond to input for the device tracking service. The call event data set can be obtained, in some embodiments, from a network monitor or other entities and/or devices. The call event data set can include call events for one or more interfaces of the network and therefore can reflect various call events for one or more user equipment. The server computer can correlate call event data for one or more subscriber or user equipment represented by the call event data set, for example, by correlating control plane packets and user plane packets associated with one or more subscriber (e.g., one or more user equipment) to create an updated call event data set. The updated call event data set can be stored by the server computer in a cache or other data storage device or resource. It should be understood that this example embodiment is illustrative, and therefore should not be construed as being limiting in any way.

The server computer can obtain transit data, which can indicate one or more public transit routes and associated geographic locations. The server computer also can obtain network topology data, which can indicate one or more network assets (e.g., network infrastructure elements) and their respective geographic locations. The server computer can obtain the transit data and the network topology data, for example, from the one or more data sources such as one or more network topology devices, one or more network information storage logs or devices (e.g., one or more devices for storing information about network assets, their respective geographic locations, etc.), one or more public transit map databases (e.g., devices for storing public transit information including locations of routes, etc.), other types of data sources, combinations thereof, or the like.

The server computer can enrich the call event data set with location and/or time information obtained from the network topology data and the transit data. Thus, for example, the server computer can be configured to determine, for a particular call event represented in the call event data set, where a particular user, subscriber, and/or user equipment was located (in terms of absolute geographic location as well as geographic location relative to transit routes and relative to network infrastructure) when the call event occurred, a time at which the call event occurred, and/or other information associated with the call event, and to enrich the call event data set with these and/or other data. The server computer can again store the enriched call event data set. It should be understood that this example embodiment is illustrative, and therefore should not be construed as being limiting in any way.

The server computer can analyze the updated and/or enriched call event data set and identify, based on the enriched call event data set, one or more movements associated with one or more instances of user equipment. As explained in more detail herein, the server computer can determine movements for one or more user equipment represented by the updated and/or enriched call event data set based on analyzing the call events. In various embodiments of the concepts and technologies disclosed herein, the server computer may only be configured to consider call events that relate to voice over long term evolution ("VOLTE") calls and/or voice over new radio ("VoNR") calls (as opposed to data sessions, control channel events, and the like). It should be understood that this example embodiment is illustrative, and therefore should not be construed as being limiting in any way. The server computer can also determine, e.g., based on the movements detected, if multiple instances of user equipment are moving in unison. The server computer can determine that multiple user equipment are moving in unison by determining movements associated with two or more user equipment (and looking for multiple user equipment that have similar and/or consistent and/or identical movements over time) as explained in more detail herein.

If the server computer determines that two or more user equipment are not moving in unison (i.e., that two or more user equipment are not co-travelling on public transit), the server computer can determine if a microrecord is to be published by the server computer (e.g., to update the call event data set with the movement(s) detected by the server computer). If the server computer determines that two or more user equipment are moving in unison (e.g., that two or more user equipment are co-travelling on public transit or the like), the server computer can determine if a macrorecord (e.g., a record that indicates the simultaneous movements of the two or more user equipment and other information about the movement) is to be published. In some cases, the server computer can publish one or more microrecord and one or more macrorecord. It should be understood that this example embodiment is illustrative, and therefore should not be construed as being limiting in any way.

If the server computer determines that a microrecord and/or macrorecord are to be published, the server computer can publish one or more microrecord(s) and/or macrorecords to the data store (e.g., for storage in the device tracking log). As noted above, the server computer also can update the call event data set with the movements identified, and the updated call event data set can be stored by the server computer (e.g., in a local data storage or cache, a remote data storage or cache, or the like). The device tracking log can be used (e.g., by a user device or other device) for obtaining information about movements of the one or more user equipment with respect to the network. In some instances, for example, the information from the device tracking log can be used to adjust resources and/or assets of the network, for quality control purposes, and/or for other reasons. Because the device tracking log can be used for additional and/or alternative purposes and/or can be used by additional and/or alternative entities, it should be understood that these example embodiments are illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include obtaining, from a network monitor that accesses an interface of a network, a call event data set that can include data that can define call events associated with multiple instances of user equipment; obtaining, from a data source, transit data that can define geographic locations and routes associated with public transit and network topology data that can define geographic locations of network infrastructure associated with the network; identifying, based on the call event data set, the transit data, and the network topology data, two or more movements associated with the multiple instances of user equipment; determining, based on the multiple movements, if two or more of the multiple instances of user equipment are moving in unison, and in response to a determination that the two or more of the multiple instances of user equipment are moving in unison, publishing a macrorecord to a device tracking log. The macrorecord can include a count of the two or more of the multiple instances of user equipment, an average speed of the two or more of the multiple instances of user equipment, and a travel mode associated with the two or more of the multiple instances of user equipment. The operations further can include in response to a determination that the two or more of the multiple instances of user equipment are not moving in unison, updating the call event data set with information that can define a device identifier, a type of device, a travel mode, and a location associated with at least one of the multiple instances of user equipment.

In some embodiments, the network monitor can include a network probe, and the interface of the network can include an S1 interface or an N11 interface. In some embodiments, determining if the two or more of the multiple instances of user equipment are moving in unison can include determining, based on the transit data, the network topology data, and the call event data set, that a first of the two or more of the multiple instances of user equipment has movements over time that are substantially similar to further movements of a second of the two or more of the multiple instances of user equipment over the time. In some embodiments, identifying the multiple movements can include analyzing the call event data set to identify devices that are making telephone calls, where the devices can include the two or more of the multiple instances of user equipment; analyzing, for each of the two or more of the multiple instances of user equipment, two or more general packet radio service tunneling protocol messages that can include indications of geographic location; and determining, based on the multiple general packet radio service tunneling protocol messages, a change in location, a speed, and a direction of movement for each of the two or more of the multiple instances of user equipment.

In some embodiments, identifying the devices that are making the telephone calls can include analyzing the call event data set to determine, based on access point names and quality of service class identifiers that are equal to one, the devices associated with the call event data set. In some embodiments, the operations further can include in response to the determination that the two or more of the multiple instances of user equipment are not moving in unison, publishing a microrecord to the device tracking log. The microrecord can include data that can define the device identifier, the type of device, the travel mode, and the location associated with at least one of the multiple instances of user equipment. In some embodiments, the travel mode can include public transit.

According to another aspect of the concepts and technologies disclosed herein, a method is disclosed. The method can include obtaining, by a computer comprising a processor and from a network monitor that accesses an interface of a network, a call event data set that can include data that can define call events associated with multiple instances of user equipment; obtaining, by the processor and from a data source, transit data that can define geographic locations and routes associated with public transit and network topology data that can define geographic locations of network infrastructure associated with the network; identifying, by the processor and based on the call event data set, the transit data, and the network topology data, two or more movements associated with the multiple instances of user equipment; determining, by the processor and based on the multiple movements, if two or more of the multiple instances of user equipment are moving in unison, and in response to a determination that the two or more of the multiple instances of user equipment are moving in unison, publishing by the processor, a macrorecord to a device tracking log. The macrorecord can include a count of the two or more of the multiple instances of user equipment, an average speed of the two or more of the multiple instances of user equipment, and a travel mode associated with the two or more of the multiple instances of user equipment. The method further can include in response to a determination that the two or more of the multiple instances of user equipment are not moving in unison, updating, by the processor, the call event data set with information that can define a device identifier, a type of device, a travel mode, and a location associated with at least one of the multiple instances of user equipment.

In some embodiments, the network monitor can include a network probe, and the interface of the network can include an S1 interface or an N11 interface. In some embodiments, determining if the two or more of the multiple instances of user equipment are moving in unison can include determining, based on the transit data, the network topology data, and the call event data set, that a first of the two or more of the multiple instances of user equipment has movements over time that are substantially similar to further movements of a second of the two or more of the multiple instances of user equipment over the time. In some embodiments, identifying the multiple movements can include analyzing the call event data set to identify devices that are making telephone calls, where the devices can include the two or more of the multiple instances of user equipment; analyzing, for each of the two or more of the multiple instances of user equipment, two or more general packet radio service tunneling protocol messages that can include indications of geographic location; and determining, based on the multiple general packet radio service tunneling protocol messages, a change in location, a speed, and a direction of movement for each of the two or more of the multiple instances of user equipment.

In some embodiments, identifying the devices that are making the telephone calls can include analyzing the call event data set to determine, based on access point names and quality of service class identifiers that are equal to one, the devices associated with the call event data set. In some embodiments, the operations further can include in response to the determination that the two or more of the multiple instances of user equipment are not moving in unison, publishing a microrecord to the device tracking log. The microrecord can include data that can define the device identifier, the type of device, the travel mode, and the location associated with at least one of the multiple instances of user equipment. In some embodiments, the travel mode can include public transit.

According to yet another aspect of the concepts and technologies disclosed herein, a computer storage medium is disclosed. The computer storage medium can store computer-executable instructions that, when executed by a processor, cause the processor to perform operations. The operations can include obtaining, from a network monitor that accesses an interface of a network, a call event data set that can include data that can define call events associated with multiple instances of user equipment; obtaining, from a data source, transit data that can define geographic locations and routes associated with public transit and network topology data that can define geographic locations of network infrastructure associated with the network; identifying, based on the call event data set, the transit data, and the network topology data, two or more movements associated with the multiple instances of user equipment; determining, based on the multiple movements, if two or more of the multiple instances of user equipment are moving in unison, and in response to a determination that the two or more of the multiple instances of user equipment are moving in unison, publishing a macrorecord to a device tracking log. The macrorecord can include a count of the two or more of the multiple instances of user equipment, an average speed of the two or more of the multiple instances of user equipment, and a travel mode associated with the two or more of the multiple instances of user equipment. The operations further can include in response to a determination that the two or more of the multiple instances of user equipment are not moving in unison, updating the call event data set with information that can define a device identifier, a type of device, a travel mode, and a location associated with at least one of the multiple instances of user equipment.

In some embodiments, the network monitor can include a network probe, and wherein the interface of the network can include an S1 interface or an N11 interface. In some embodiments, determining if the two or more of the multiple instances of user equipment are moving in unison can include determining, based on the transit data, the network topology data, and the call event data set, that a first of the two or more of the multiple instances of user equipment has movements over time that are substantially similar to further movements of a second of the two or more of the multiple instances of user equipment over the time. In some embodiments, identifying the multiple movements can include analyzing the call event data set to identify devices that are making telephone calls, where the devices can include the two or more of the multiple instances of user equipment; analyzing, for each of the two or more of the multiple instances of user equipment, two or more general packet radio service tunneling protocol messages that can include indications of geographic location; and determining, based on the multiple general packet radio service tunneling protocol messages, a change in location, a speed, and a direction of movement for each of the two or more of the multiple instances of user equipment.

In some embodiments, identifying the devices that are making the telephone calls can include analyzing the call event data set to determine, based on access point names and quality of service class identifiers that are equal to one, the devices associated with the call event data set. In some embodiments, the operations further can include in response to the determination that the two or more of the multiple instances of user equipment are not moving in unison, publishing a microrecord to the device tracking log. The microrecord can include data that can define the device identifier, the type of device, the travel mode, and the location associated with at least one of the multiple instances of user equipment. In some embodiments, the travel mode can include public transit.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

BRIEF DESCRIPTION OF THE DRAWINGS

FIG. 2 schematically illustrates an instance of call event data, according to an illustrative embodiment of the concepts and technologies disclosed herein.

FIG. 3A schematically illustrates a microrecord, according to an illustrative embodiment of the concepts and technologies disclosed herein.

FIG. 3B schematically illustrates a macrorecord, according to an illustrative embodiment of the concepts and technologies disclosed herein.

DETAILED DESCRIPTION

Figure 1:
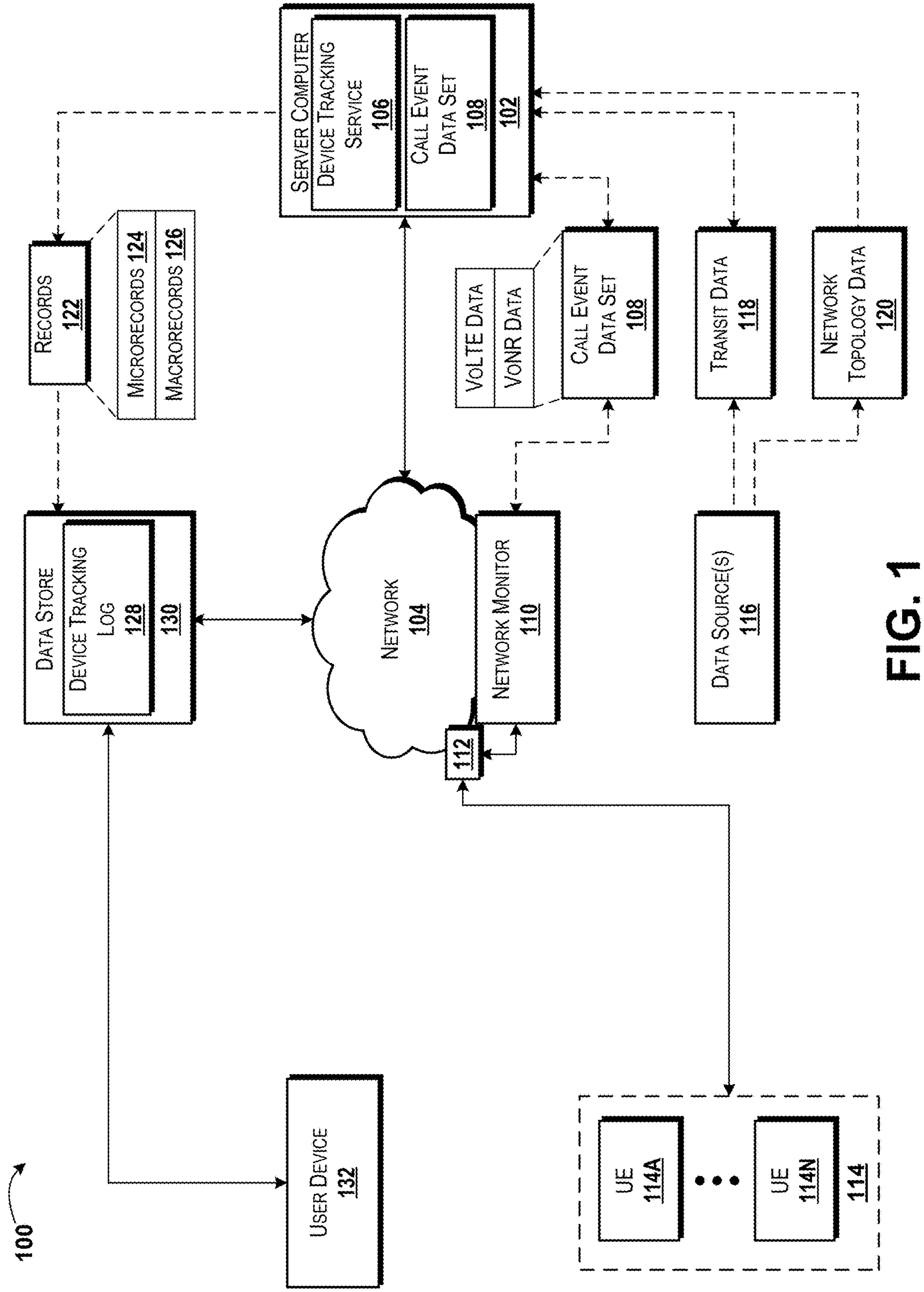
FIG. 1 is a system diagram illustrating an illustrative operating environment for various embodiments of the concepts and technologies described herein.

The following detailed description is directed to a device tracking service. A server computer that hosts the device tracking service can obtain an initial instance of call event data set, which can correspond to input for the device tracking service. The call event data set can be obtained, in some embodiments, from a network monitor or other entities and/or devices. The call event data set can include call events for one or more interfaces of the network and therefore can reflect various call events for one or more user equipment. The server computer can correlate call event data for one or more subscriber or user equipment represented by the call event data set, for example by correlating control plane packets and user plane packets associated with one or more subscriber (e.g., one or more user equipment) to create an updated call event data set. The updated call event data set can be stored by the server computer in a cache or other data storage device or resource. It should be understood that this example embodiment is illustrative, and therefore should not be construed as being limiting in any way.

The server computer can obtain transit data, which can indicate one or more public transit routes and associated geographic locations. The server computer also can obtain network topology data, which can indicate one or more network assets (e.g., network infrastructure elements) and their respective geographic locations. The server computer can obtain the transit data and the network topology data, for example, from the one or more data sources such as one or more network topology devices, one or more network information storage logs or devices (e.g., one or more devices for storing information about network assets, their respective geographic locations, etc.), one or more public transit map databases (e.g., devices for storing public transit information including locations of routes etc.), other types of data sources, combinations thereof, or the like.

The server computer can enrich the call event data set with location and/or time information obtained from the network topology data and the transit data. Thus, for example, the server computer can be configured to determine, for a particular call event represented in the call event data set, where a particular user, subscriber, and/or user equipment was located (in terms of absolute geographic location as well as geographic location relative to transit routes and relative to network infrastructure) when the call event occurred, a time at which the call event occurred, and/or other information associated with the call event, and to enrich the call event data set with these and/or other data. The server computer can again store the enriched call event data set. It should be understood that this example embodiment is illustrative, and therefore should not be construed as being limiting in any way.

The server computer can analyze the updated and/or enriched call event data set and identify, based on the enriched call event data set, one or more movements associated with one or more instances of user equipment. As explained in more detail herein, the server computer can determine movements for one or more user equipment represented by the updated and/or enriched call event data set based on analyzing the call events. In various embodiments of the concepts and technologies disclosed herein, the server computer may only be configured to consider call events that relate to VOLTE calls and/or VoNR calls (as opposed to data sessions, control channel events, and the like). It should be understood that this example embodiment is illustrative, and therefore should not be construed as being limiting in any way. The server computer can also determine, e.g., based on the movements detected, if multiple instances of user equipment are moving in unison. The server computer can determine that multiple user equipment are moving in unison by determining movements associated with two or more user equipment (and looking for multiple user equipment that have similar and/or consistent and/or identical movements over time) as explained in more detail herein.

If the server computer determines that two or more user equipment are not moving in unison (i.e., that two or more user equipment are not co-travelling on public transit), the server computer can determine if a microrecord is to be published by the server computer (e.g., to update the call event data set with the movement(s) detected by the server computer). If the server computer determines that two or more user equipment are moving in unison (e.g., that two or more user equipment are co-travelling on public transit or the like), the server computer can determine if a macrorecord (e.g., a record that indicates the simultaneous movements of the two or more user equipment and other information about the movement) is to be published. In some cases, the server computer can publish one or more microrecord and one or more macrorecord. It should be understood that this example embodiment is illustrative, and therefore should not be construed as being limiting in any way.

If the server computer determines that a microrecord and/or macrorecord are to be published, the server computer can publish one or more microrecord(s) and/or macrorecords to the data store (e.g., for storage in the device tracking log). As noted above, the server computer also can update the call event data set with the movements identified, and the updated call event data set can be stored by the server computer (e.g., in a local data storage or cache, a remote data storage or cache, or the like). The device tracking log can be used (e.g., by a user device or other device) for obtaining information about movements of the one or more user equipment with respect to the network. In some instances, for example, the information from the device tracking log can be used to adjust resources and/or assets of the network, for quality control purposes, and/or for other reasons. Because the device tracking log can be used for additional and/or alternative purposes and/or can be used by additional and/or alternative entities, it should be understood that these example embodiments are illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for providing and using a device tracking service will be described, according to an illustrative embodiment. The operating environment 100 shown in FIG. 1 includes a server computer 102. The server computer 102 can operate in communication with and/or as part of a communications network ("network") 104, though this is not necessarily the case. According to some embodiments of the concepts and technologies disclosed herein, the network 104 can correspond to a mobility network and/or components thereof, as will be explained in more detail below with reference to FIG. 5. It should be understood that this example embodiment is illustrative, and therefore should not be construed as being limiting in any way.

According to various embodiments, the functionality of the server computer 102 may be provided by one or more server computers, application servers, web servers, compute and/or data storage resources, other computing systems, and the like. It should be understood that the functionality of the server computer 102 may be provided by a single device, by two or more similar devices, and/or by two or more dissimilar devices. For purposes of describing the concepts and technologies disclosed herein, the server computer 102 is described herein as an application server. It should be understood that this embodiment is illustrative, and should not be construed as being limiting in any way.

The server computer 102 can execute an operating system (not shown in FIG. 1) and one or more application programs such as, for example, a device tracking service 106. The operating system can include a computer program that can control the operation of the server computer 102. The device tracking service 106 can include an executable program that can be configured to execute on top of the operating system to provide various functions as illustrated and described herein. According to various embodiments of the concepts and technologies disclosed herein, the server computer 102 also can store a call event data set 108, which can correspond to an input for the device tracking service 106 to provide the functionality illustrated and described herein. As will be explained in more detail herein, the device tracking service 106 can perform various operations on the call event data set 108 and create one or more iterations and/or enrichments of the call event data set 108. The device tracking service 106 can be configured to obtain, from a probe, monitor, or other device (hereinafter referred to as a "network monitor 110"), the call event data set 108, which as noted above can correspond to input for the device tracking service 106. It should be understood that this example embodiment is illustrative, and therefore should not be construed as being limiting in any way.

According to various embodiments of the concepts and technologies disclosed herein, the network monitor 110 can include and/or correspond to one or more probes that can obtain packet streams associated with a particular interface 112 associated with the network 104. In some embodiments, the interface 112 can correspond to an S1 interface, an S11 interface, an N1 interface, and/or the like. Thus, it can be appreciated that the call event data set 108 and/or other data obtained by the network monitor 110 can correspond to data generated by and/or associated with one or more instances of user equipment ("UE") 114A-N (hereinafter collectively and/or generically referred to as "user equipment 114"), one or more radios and/or radio controllers, and/or one or more other devices and/or entities associated with the network 104. Furthermore, it should be understood that the call event data set 108 can include VOLTE data and/or VoNR data that can be collected from the one or more interfaces 112 on the network 104. It should be understood that these example embodiments are illustrative, and therefore should not be construed as being limiting in any way.

It can be appreciated that by analyzing the VOLTE data and/or VoNR data of the call event data set 108, the device tracking service 106 can detect a number of devices (e.g., a number of user equipment 114) on voice calls, start times and/or durations of the calls, location(s) of the user equipment 114 at a current time and/or during the course of the calls, and/or other aspects of the devices and/or calls. Furthermore, quality indicators such as noise levels, bandwidth, connection speeds, packet counts, etc., can enable the device tracking service 106 to detect QoS associated with the calls. It should be understood that this example embodiment is illustrative, and therefore should not be construed as being limiting in any way.

According to various embodiments of the concepts and technologies disclosed herein, the network monitor 110 can obtain the packets from a packet broker (not separately shown in FIG. 1), which can provide packets associated with a control plane of the network 104, a user plane of the network 104, combinations thereof, or the like. The network monitor 110 can obtain the packets, in some embodiments, and forward the packets (e.g., as the call event data set 108) to the device tracking service 106. In some other embodiments, the network monitor 110 (or probe) can be configured to correlate (e.g., through a generative artificial intelligence module or the like) the user plane packets and the control plane packets to create the call event data set 108. In yet other embodiments, the functionality for correlating the packets is included in the device tracking service 106, and that is the embodiment that will be illustrated herein for clarity. It should be understood that this example embodiment is illustrative, and therefore should not be construed as being limiting in any way.

According to various embodiments of the concepts and technologies disclosed herein, the call event data set 108 can include multiple records (e.g., corresponding to call events), and each record can include multiple fields. An example of the call event data set 108 is illustrated and described hereinbelow with reference to FIG. 2. It should be understood that this example embodiment is illustrative, and therefore should not be construed as being limiting in any way.

The operating environment 100 also can include one or more data sources 116 (though only one is shown in FIG. 1). The data sources 116 can include, for example, one or more network topology devices, network information storage logs or devices (e.g., devices for storing information about network assets, their respective geographic locations, etc.), public transit map databases (e.g., devices for storing public transit information including locations of routes, etc.), other types of data sources, combinations thereof, or the like. According to various embodiments of the concepts and technologies disclosed herein, the device tracking service 106 can be configured to receive, from the data sources 116, transit data 118, network topology data 120, other data, combinations thereof, or the like.

According to various embodiments of the concepts and technologies disclosed herein, the transit data 118 can include one or more data, data points, data records, and/or data sets that can define various transit routes and/or methods in a geographic area. For example, the transit data 118 can include a list of points (e.g., latitude and longitude coordinates or the like) that can define transit routes such as rail lines, bus lines, highways, or the like. Thus, the transit data 118 can be used to determine locations of stations, bus stops, and the like; travel routes; speeds associated with different portions of the travel routes; combinations thereof; or the like. The transit data 118 can be used as illustrated and described herein for correlating call events of the call event data set 108 with transit routes, for example, to determine if multiple user equipment 114 are travelling in unison and/or for other purposes as will be explained in more detail herein. It should be understood that this example embodiment is illustrative, and therefore should not be construed as being limiting in any way.

According to various embodiments of the concepts and technologies disclosed herein, the network topology data 120 can include one or more data, data points, data records, and/or data sets that can define a topology of a network such as what assets exist on the network, where those assets are located, and the like, for a particular geographic area. For example, the network topology data 120 can include a list of points (e.g., latitude and longitude coordinates or the like) associated with network assets (e.g., antennas, towers, radios, radio controllers, and the like). Thus, the network topology data 120 can be used to determine where particular elements of the network 104 are located (e.g., a particular cell tower may be located at a specific location, etc.). Thus, as will be explained in more detail below, the network topology data 120 can be used as illustrated and described herein for correlating call events of the call event data set 108 with a network topology, for example, to determine if a user equipment 114 and/or multiple user equipment 114 have moved from a first geographic location to a second geographic location, to determine if two or more user equipment 114 are travelling in unison and/or for other purposes as will be explained in more detail herein. It should be understood that this example embodiment is illustrative, and therefore should not be construed as being limiting in any way.

The device tracking service 106 can obtain the call event data set 108 (e.g., from the network monitor 110). In various embodiments of the concepts and technologies disclosed herein, the call event data set 108 can be provided as data and/or packet streams and/or as records. In any event, the device tracking service 106 can be configured to correlate the call event data from the call event data set 108 for each subscriber represented in the call event data set 108. Thus, for example, the device tracking service 106 can be configured to correlate user plane packets and control plane packets associated with the user to create correlated call event data for each subscriber. The device tracking service 106 also can be configured to update the call event data set 108 based on the correlated packets for each subscriber, in some embodiments. It should be understood that this example embodiment is illustrative, and therefore should not be construed as being limiting in any way.

The device tracking service 106 can obtain the transit data 118 and the network topology data 120, for example, from the one or more data sources 116. The device tracking service 106 can be configured to enrich the call event data set 108 with information from the transit data 118 and the network topology data 120. Thus, for example, the device tracking service 106 can be configured to determine, for a particular call event represented in the call event data set 108, where a particular user, subscriber, and/or user equipment 114 was located and a time at which the call event occurred. This can be accomplished, in some embodiments, by correlating the network asset at which the call event occurred with the network topology represented by the network topology data 120 to determine a geographic location associated with the call event. The device tracking service 106 also can correlate the determined geographic location with the transit routes and/or the like represented by the transit data 118 to determine if call events were associated with and/or occurred at one or more transit locations. It should be understood that this example embodiment is illustrative, and therefore should not be construed as being limiting in any way.

This correlation of call events to locations and locations to transit routes (and the like) can be iterated by the device tracking service 106 until the entire call event data set 108 has been enriched with the location and/or time information. The device tracking service 106 can then store the updated call event data set 108 and/or enriched call event data set 108 for immediate and/or future analysis. The device tracking service 106 can analyze the call event data set 108 to determine one or more movements associated with one or more user equipment 114. Movements of the user equipment 114 can be detected by identifying two data records or data points that have two different times and two different locations.

The device tracking service 106 can determine, based on the movements of the user equipment 114 represented by the call event data set 108, if one or more user equipment 114 is moving in unison. As used herein and in the claims, two or more user equipment 114 can be considered to be moving "in unison" when the movements of the respective user equipment 114 are substantially similar in terms of direction and speed and occur substantially at the same time. Thus, for example, if two user equipment 114 are located in a car together, one would expect that both user equipment 114 would move on a similar path, at a similar speed, and substantially at the same time. It should be understood that this example embodiment is illustrative, and therefore should not be construed as being limiting in any way.

The device tracking service 106 also can determine if one or more records 122 should be published at various times. In particular, if the device tracking service 106 determines that multiple user equipment 114 are not moving in unison, the device tracking service 106 can further determine if a microrecord 124 is to be published. As will be illustrated and described in more detail below with reference to FIG. 3A, the microrecord 124 can correspond to a data record that can record state associated with a particular event or time. Thus, for example, the microrecord 124 can record state associated with the one or more user equipment 114 such as, for example, identifying information associated with the one or more user equipment 114, a device type associated with the one or more user equipment 114, a travel mode (e.g., private transit, public transit, or the like) associated with the one or more user equipment 114, an average speed associated with the one or more user equipment 114, an average time duration during which the one or more user equipment 114 is/are moving during a call, real time location(s) associated with the one or more user equipment 114 during a call (e.g., based on cell identifiers, longitude/latitude, and/or public transit maps), noise level information, combinations thereof, or the like.

In various embodiments of the concepts and technologies disclosed herein, the microrecord 124 can represent, for example, a) identifying information for a user equipment 114 such as, for example, a device identifier such as a mobile station international subscriber directory number ("MSISDN"), an international mobile equipment identity ("IMEI"), an international mobile subscriber identity ("IMSI"), or other identifier; b) a type of device such as a mobile handset, a tablet, a connected car, or the like; c) a subscriber travel mode such as public (bus, rail, or the like), or private; d) an average subscriber travel speed; e) an average time duration a subscriber is travelling during a call; f) a subscriber's possible location in real-time based on cell identifiers ("CellIDs") and latitude or longitude as aligned with public transport travel maps; and g) a possible level of ambient and/or radio noise such as high, medium, normal, low, or the like. The microrecords 124 will be illustrated and described in more detail below with reference to FIG. 3A. It should be understood that this example embodiment is illustrative, and therefore should not be construed as being limiting in any way.

The device tracking service 106 also can determine if a macrorecord 126 is to be published. As will be illustrated and described in more detail below with reference to FIG. 3B, the macrorecord 126 can correspond to a data record that can record state associated with a particular multi-device event or time such as multiple user equipment 114 moving in unison as explained above. In various embodiments of the concepts and technologies disclosed herein, the macrorecord 126 can represent, for example, a) a count of user equipment 114 making voice calls (e.g., VOLTE calls) from a particular geographic location; b) location updates of the subscribers associated with the multi-device event (can be updated in real-time); c) a count of subscribers making voice calls (e.g., VOLTE calls) and travelling together; d) a travel mode associated with the travel; e) an average possible speed of the subscribers (likely equal for all); and f) a possible level of noise (relative to other calls occurring at the same time) such as high, medium, normal, low, or the like. The macrorecords 126 will be illustrated and described in more detail below with reference to FIG. 3B. It should be understood that this example embodiment is illustrative, and therefore should not be construed as being limiting in any way.

The device tracking service 106 can be configured to publish the records 122, for example to a device tracking log 128 that can be hosted and/or stored at a data store 130. According to various embodiments, the functionality of the data store 130 can be provided by one or more databases, server computers, data storage devices, other computing systems or devices, or the like. In the illustrated embodiments, the functionality of the data store 130 can be provided by one or more data storage resources such as a database, a data storage device, a server computer, combinations thereof, or the like. It should be understood that this example embodiment is illustrative, and therefore should not be construed as being limiting in any way.

The operating environment 100 also can include a user device 132. The user device 132 can be configured to connect to and/or to interact with the device tracking log 128 for various reasons. For example, the user device 132 can be configured to interact with the device tracking log 128 (which can include microrecords 124, macrorecords 126, and/or other data) to determine if multiple users are travelling along a transit route in unison. If so, this information can be used by the user device 132 to modify one or more aspects of the network 104 such as, for example, creating and/or tearing down resources, and the like. The information also can be used to update call event logs and/or call event data sets 108 (e.g., to update where particular devices and/or subscribers are at particular times). Because the device tracking log 128 can be used at additional and/or alternative times for these and/or alternative purposes, it should be understood that these example embodiments are illustrative, and therefore should not be construed as being limiting in any way.

In practice, a server computer 102 that hosts the device tracking service 106 can obtain an initial instance of a call event data set 108, which can correspond to input for the device tracking service 106. The call event data set 108 can be obtained, in some embodiments, from a network monitor 110 or other entities and/or devices. The call event data set 108 can include call events for one or more interfaces 112 of the network 104 and therefore can reflect various call events for one or more user equipment 114. The server computer 102 can correlate call event data for one or more subscriber or user equipment 114 represented by the call event data set 108, for example by correlating control plane packets and user plane packets associated with one or more subscriber (e.g., one or more user equipment 114) to create an updated call event data set 108. The updated call event data set 108 can be stored by the server computer 102 in a cache or other data storage device or resource. It should be understood that this example embodiment is illustrative, and therefore should not be construed as being limiting in any way.

The server computer 102 can obtain transit data 118, which can indicate one or more public transit routes and associated geographic locations. The server computer 102 also can obtain network topology data 120, which can indicate one or more network assets (e.g., network infrastructure elements) and their respective geographic locations. The server computer 102 can obtain the transit data 118 and the network topology data 120, for example, from the one or more data sources 116 such as one or more network topology devices, one or more network information storage logs or devices (e.g., one or more devices for storing information about network assets, their respective geographic locations, etc.), one or more public transit map databases (e.g., devices for storing public transit information including locations of routes, etc.), other types of data sources, combinations thereof, or the like.

The server computer 102 can enrich the call event data set 108 with location and/or time information obtained from the network topology data 120 and the transit data 118. Thus, for example, the server computer 102 can be configured to determine, for a particular call event represented in the call event data set 108, where a particular user, subscriber, and/or user equipment 114 was located (in terms of absolute geographic location as well as geographic location relative to transit routes and relative to network infrastructure) when the call event occurred, a time at which the call event occurred, and/or other information associated with the call event, and to enrich the call event data set 108 with these and/or other data. The server computer 102 can again store the enriched call event data set 108. It should be understood that this example embodiment is illustrative, and therefore should not be construed as being limiting in any way.

The server computer 102 can analyze the updated and/or enriched call event data set 108 and identify, based on the enriched call event data set 108, one or more movements associated with one or more instances of user equipment 114. As explained in more detail herein, the server computer 102 can determine movements for one or more user equipment 114 represented by the updated and/or enriched call event data set 108 based on analyzing the call events. In various embodiments of the concepts and technologies disclosed herein, the server computer 102 may only be configured to consider call events that relate to VOLTE calls and/or VoNR calls (as opposed to data sessions, control channel events, and the like). It should be understood that this example embodiment is illustrative, and therefore should not be construed as being limiting in any way. The server computer 102 can also determine, e.g., based on the movements detected, if multiple instances of user equipment 114 are moving in unison. The server computer 102 can determine that multiple user equipment 114 are moving in unison by determining movements associated with two or more user equipment 114 (and looking for multiple user equipment 114 that have similar and/or consistent and/or identical movements over time) as explained in more detail herein.

If the server computer 102 determines that two or more user equipment 114 are not moving in unison (i.e., that two or more user equipment 114 are not co-travelling on public transit), the server computer 102 can determine if a microrecord 124 is to be published by the server computer 102 (e.g., to update the call event data set 108 with the movement(s) detected by the server computer 102). If the server computer 102 determines that two or more user equipment 114 are moving in unison (e.g., that two or more user equipment 114 are co-travelling on public transit or the like), the server computer 102 can determine if a macrorecord 126 (e.g., a record that indicates the simultaneous movements of the two or more user equipment 114 and other information about the movement) is to be published. In some cases, the server computer 102 can publish one or more microrecord 124 and one or more macrorecord 126. It should be understood that this example embodiment is illustrative, and therefore should not be construed as being limiting in any way.

If the server computer 102 determines that a microrecord 124 and/or macrorecord 126 are to be published, the server computer 102 can publish one or more microrecord(s) 124 and/or macrorecord(s) 126 to the data store 130 (e.g., for storage in the device tracking log 128). As noted above, the server computer 102 also can update the call event data set 108 with the movements identified, and the updated call event data set 108 can be stored by the server computer 102 (e.g., in a local data storage or cache, a remote data storage or cache, or the like). The device tracking log 128 can be used (e.g., by a user device 132 or other device) for obtaining information about movements of the one or more user equipment 114 with respect to the network 104. In some instances, for example, the information from the device tracking log 128 can be used to adjust resources and/or assets of the network 104, for quality control purposes, and/or for other reasons. Because the device tracking log 128 can be used for additional and/or alternative purposes and/or can be used by additional and/or alternative entities, it should be understood that these example embodiments are illustrative, and therefore should not be construed as being limiting in any way.

FIG. 1 illustrates one server computer 102, one network 104, one network monitor 110, two instances of user equipment 114, one instance of data sources 116, one data store 130, and one user device 132. It should be understood, however, that various implementations of the operating environment 100 can include zero, one, or more than one server computer 102; zero, one, or more than one network 104; one or more than one user equipment 114; one or more than one instance of data sources 116; one or more than one data store 130; and/or zero, one, or more than one user device 132. As such, the illustrated embodiment should be understood as being illustrative, and should not be construed as being limiting in any way.

Turning now to FIG. 2, additional aspects of a call event data set 108 will be illustrated and described. In particular, FIG. 2 illustrates an example table 200 showing variables 202A-R (hereinafter collectively and/or generically referred to as "variables 202") and associated descriptions of the variables 202. Thus, it can be appreciated with reference to FIG. 2 that the call event data set 108 can include one or more variables for defining one or more device identifiers (e.g., the variables 202A, 202B, and 202C); one or more variables 202D for defining an access point name or other packet data network identifier to which a user equipment 114 has attempted to attach; one or more variables 202E for defining a QCI; one or more variables 202F for defining a radio access type ("RAT") such as 2G, 3G, or 4G, or the like; one or more variables 202G for defining a second generation or third generation network location area code ("Lac"); one or more variables 202H for defining a third generation service area code ("Sac"), one or more variables 202I for defining a second generation cell identifier ("Ci"), one or more variables 202J for defining a fourth generation tracking area code ("Tac"), one or more variables 202K for defining a fourth or fifth generation cell identifier ("Eci or NCI"), one or more variables 202L for defining a cell mobile country code ("Mcc"), one or more variables 202M for defining a cell mobile network code ("Mnc"), one or more variables 202N for defining times of messages seen on a probe interface, one or more variables 202O for defining a call start time, one or more variables 202P for defining a call end time, one or more variables 202Q for defining a round trip time ("RTT"), and/or one or more variables 202R for defining a packet per second rate. Because additional and/or alternative variables and/or variable formats and values are possible and contemplated, it should be understood that these example embodiments are illustrative, and therefore should not be construed as being limiting in any way.

Turning now to FIG. 3A, additional aspects of the records 122 will be illustrated and described. In particular, FIG. 3A illustrates an example table 300 showing variables 302A-G (hereinafter collectively and/or generically referred to as "variables 302") of the microrecords 124 and associated descriptions of the variables 302. It should be understood that the illustrated embodiment of the table 300 is illustrative and should not be construed as being limiting in any way.

As shown in FIG. 3A, the microrecords 124 can include one or more variables 302A for defining one or more device identifiers (e.g., an MSISDN, an IMEI, an IMSI, etc.); one or more variables 302B for defining a type of device associated with the user equipment 114 (e.g., a mobile handset, connected car, or the like); one or more variables 302C for defining a travel mode associated with the one or more user equipment 114 such as public transit, private transit, and the like; one or more variables 302D for defining an average subscriber's travel speed associated with the user equipment 114; one or more variables 302E for defining an average time duration for which the one or more user equipment 114 (e.g., the subscriber) is moving/travelling during a call; one or more variables 302F for defining a possible location of the user equipment 114 (e.g., based on cell IDs, latitude/longitude information, public transit maps, and the like); and/or one or more variables 302G for defining a noise level (e.g., high, normal, etc.). Because additional and/or alternative variables and/or values are possible and/or contemplated for the microrecords 124, it should be understood that these example embodiments are illustrative, and therefore should not be construed as being limiting in any way.

Turning now to FIG. 3B, additional aspects of the records 122 will be illustrated and described. In particular, FIG. 3B illustrates an example table 304 showing variables 306A-F (hereinafter collectively and/or generically referred to as "variables 306") of the macrorecords 126 and associated descriptions of the variables 306. It should be understood that the illustrated embodiment of the table 300 is illustrative and should not be construed as being limiting in any way.

As shown in FIG. 3B, the macrorecords 126 can include one or more variables 306A for defining a count of user equipment 114 (e.g., subscribers) making VOLTE calls from a particular location; one or more variables 306B for defining location updates for the one or more user equipment 114 in realtime; one or more variables 306C for defining a count of user equipment 114 (e.g., subscribers) making VOLTE calls at a particular time and travelling together (e.g., in a car, on public transit, or the like); one or more variables 306D for defining a travel mode associated with the one or more user equipment 114 such as public transit, private transit, and the like; one or more variables 306E for defining an average speed associated with the one or more user equipment 114 (e.g., the subscriber) that is moving/travelling during a call; and/or one or more variables 306F for defining a noise level (e.g., high, normal, etc.), which can be defined as being high, normal, or the like relative to all other calls occurring on the same tower in some embodiments. It should be understood that this example embodiment is illustrative, and therefore should not be construed as being limiting in any way. Because additional and/or alternative variables and/or values are possible and/or contemplated for the macrorecords 126, it should be understood that these example embodiments are illustrative, and therefore should not be construed as being limiting in any way.

Figure 4:
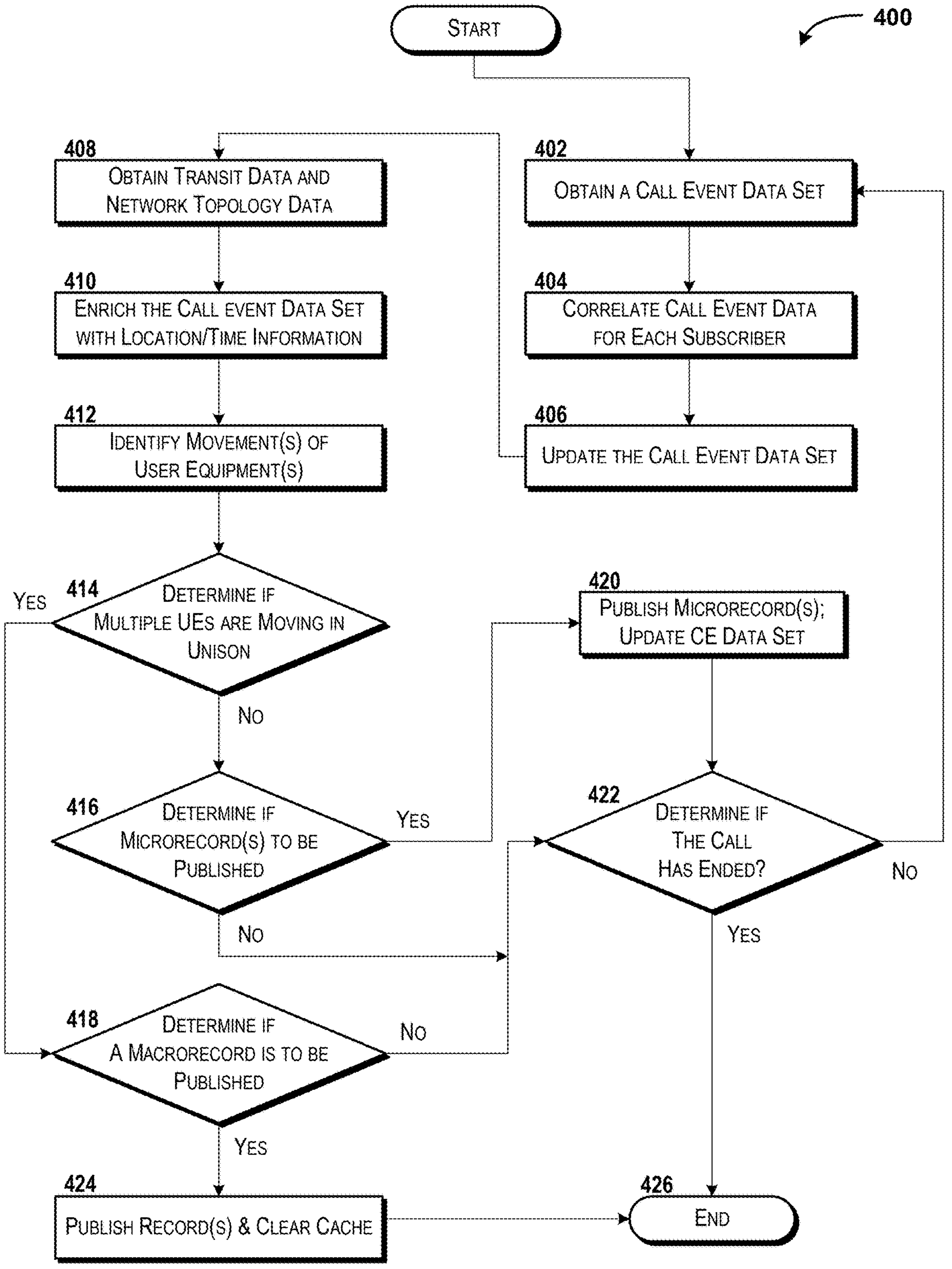
FIG. 4 is a flow diagram showing aspects of a method for tracking device location using a device tracking service, according to an illustrative embodiment of the concepts and technologies described herein.

Turning now to FIG. 4, aspects of a method 400 for tracking device location using a device tracking service will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 102, to perform one or more operations and/or causing the processor to direct other components of the computing system or device to perform one or more of the operations.

For purposes of illustrating and describing the concepts of the present disclosure, the method 400 is described herein as being performed by the server computer 102 via execution of one or more software modules such as, for example, the device tracking service 106. It should be understood that additional and/or alternative devices and/or network nodes can provide the functionality described herein via execution of one or more modules, applications, and/or other software including, but not limited to, the device tracking service 106. Thus, the illustrated embodiments are illustrative, and should not be viewed as being limiting in any way.

The method 400 begins at operation 402. At operation 402, the server computer 102 can obtain a call event data set 108. As explained above, the call event data set 108 can be obtained, in some embodiments, from a network monitor 110 or other entities and/or devices. The call event data set 108 can include control plane data (e.g., packets), user plane data (e.g., packets), and/or other data. The call event data set 108 can be considered input for the server computer 102 (e.g., for the device tracking service 106) in some embodiments. It should be understood that this example embodiment is illustrative, and therefore should not be construed as being limiting in any way.

From operation 402, the method 400 can proceed to operation 404. At operation 404, the server computer 102 can correlate call event data for each subscriber represented by the call event data set 108. Thus, for example, the server computer 102 can be configured to obtain control plane packets and user plane packets associated with one or more subscriber (e.g., one or more user equipment 114) and to correlate the packets associated with each user equipment 114 (i.e., a subscriber). In so doing, the server computer 102 can create correlated call event data for each subscriber and/or device associated with the call event data set 108. It should be understood that this example embodiment is illustrative, and therefore should not be construed as being limiting in any way.

From operation 404, the method 400 can proceed to operation 406. At operation 406, the server computer 102 can update the call event data set 108 using the correlated subscriber data generated in operation 404. Thus, for example, call events associated with one or more user equipment 114 (as obtained in operation 402) can be supplemented with additional events and/or actions as reflected by the correlated data generated in operation 404. It should be understood that this example embodiment is illustrative, and therefore should not be construed as being limiting in any way.

From operation 406, the method 400 can proceed to operation 408. At operation 408, the server computer 102 can obtain network topology data 120 and the transit data 118. According to various embodiments of the concepts and technologies disclosed herein, the server computer 102 can obtain the transit data 118 and the network topology data 120, for example, from the one or more data sources 116. The data sources 116 can include, for example, one or more network topology devices, one or more network information storage logs or devices (e.g., one or more devices for storing information about network assets, their respective geographic locations, etc.), one or more public transit map databases (e.g., devices for storing public transit information including locations of routes, etc.), other types of data sources, combinations thereof, or the like. Because the server computer 102 can obtain the transit data 118 and the network topology data 120 from additional and/or alternative data sources 116, it should be understood that this example embodiment is illustrative, and therefore should not be construed as being limiting in any way.

From operation 408, the method 400 can proceed to operation 410. At operation 410, the server computer 102 can enrich the call event data set 108 with location and/or time information obtained from the network topology data 120 and the transit data 118. Thus, for example, the server computer 102 (e.g., by way of executing the device tracking service 106) can be configured to determine, for a particular call event represented in the call event data set 108, where a particular user, subscriber, and/or user equipment 114 was located when the call event occurred, a time at which the call event occurred, and/or other information associated with the call event, and to enrich the call event data set 108 with these and/or other data. Although not separately shown in FIG. 4, it can be appreciated that the enriched call event data set 108 can be stored as an updated call event data set 108. It should be understood that this example embodiment is illustrative, and therefore should not be construed as being limiting in any way.

From operation 410, the method 400 can proceed to operation 412. At operation 412, the server computer 102 can identify, based on the enriched call event data set 108, one or more movements associated with one or more instances of user equipment 114. It can be appreciated that operation 412 can include the server computer 102 determining multiple locations over multiple times for one or more user equipment 114 (e.g., by comparing at least two locations of the user equipment 114 over at least two times) to determine one or more movements associated with one or more user equipment 114. For example, if a particular user equipment 114 is located at a first location at a first time and a second location at a second time, the server computer 102 can determine a movement that was required to move the user equipment 114 from the first location to the second location between the first time and the second time (i.e., a distance travelled, a direction travelled, and a speed travelled). Thus, the server computer 102 can identify, for one or more user equipment 114, any number of movements that are represented by the updated and/or enriched call event data set 108. Because multiple user equipment 114 can be represented by the call event data set 108, it can be appreciated that the server computer 102 can identify multiple movements for multiple user equipment 114 in operation 412. It should be understood that this example embodiment is illustrative, and therefore should not be construed as being limiting in any way.

In various embodiments of operation 412, the server computer 102 can identify movements of any user equipment 114 represented by the call event data set 108 and/or can determine if one or more of the user equipment 114 are moving in unison with one another. In particular, according to various embodiments of the concepts and technologies disclosed herein, the server computer 102 can analyze the call event data set 108 to determine if one or more devices (e.g., multiple instances of user equipment 114) are making calls (e.g., over VOLTE or VoNR). As noted above, in some embodiments only calls are considered by the server computer 102 in association with the method 400. It should be understood that this example embodiment is illustrative, and therefore should not be construed as being limiting in any way.

According to various embodiments of the concepts and technologies disclosed herein, a VOLTE call may refer to the access point name ("APN") as IMS along with a QoS class identifier ("QCI") equal to 1, thereby indicating a voice call. Similarly, a VoNR call may refer to the APN with a 5G QOS identifier ("5Q1") equal to 1, thereby indicating a voice call. It should be understood that these example embodiments are illustrative, and therefore should not be construed as being limiting in any way.

For data associated with user equipment 114 involved in voice calls, messages (e.g., general packet radio service ("GPRS") tunneling protocol ("GTP") messages (e.g., GTP-C, GTP-U, and the like), packet flow control protocol ("PFCP"), and/or hypertext transfer protocol 2 ("HTTP/2") messages) can be obtained. This information can be used along with the transit data 118, which can include network asset information such as E-UTRAN cell identifiers ("ECI"), network cell information ("NCI"), device identifiers (e.g., MSISDNs, IMSIs, IMEIs, and the like) to determine movements of the devices relative to the infrastructure (e.g., towers, antennas, controllers, etc.) of the network 104.

The GTP messages can further be analyzed by the server computer 102 (e.g., via execution of the device tracking service 106) and various GTP messages (e.g., create session requests (32,33), delete session requests (36,37), modify bearer requests/responses (34,35), create bearer requests/responses (95,96), update bearer requests/responses (97,98), delete bearer requests/responses (99,100), and the like) can be referred (by the server computer 102 and/or the device tracking service 106) for additional information from the network monitor 110 such as, for example, data indicating the APN, QCI, IMSI, IMEI, MSISDN, ECI, times at which the messages were seen on the interface 112 and/or the probe or other embodiment of the network monitor 110, call start time, call end time, combinations thereof, or the like. Because additional and/or alternative messages can be referred by the device tracking service 106 for additional and/or alternative information, it should be understood that these example embodiments are illustrative, and therefore should not be construed as being limiting in any way.

The server computer 102 can further map the ECI and/or NCI locations from the network topology data 120 (as obtained in operation 408 and/or used to enrich the call event data set 108 in operation 410) to map locations of the network assets (e.g., towers, antennas, or the like) to the call event data set 108. Furthermore, the server computer 102 can further map the transit locations and/or routes associated with the transit data 118 to the call event data set 108. Furthermore, the server computer 102 can analyze other data points such as round trip times ("RTT") for the calls to determine probable distances from the multiple user equipment 114 to their respective supporting towers (e.g., based on one or more cell IDs). Furthermore, by determining at various intervals what towers the user equipment 114 are connected to and the distances between these towers (and the distances to the respective user equipment 114), the server computer 102 can further predict speed of movement of the user equipment 114. Thus, by analyzing the call event data set 108 along with the transit data 118 and the network topology data 120, the server computer 102 (e.g., via execution of the device tracking service 106) can determine if multiple user equipment 114 are moving in unison. It should be understood that this example embodiment is illustrative, and therefore should not be construed as being limiting in any way.

In some embodiments, the server computer 102 can further predict movements of user equipment 114 in unison based on detected and/or projected noise levels. In particular, operation 412 can further include the server computer 102 analyzing GTP-U inner tunnel (e.g., 5-tuple) packet counts per second for uplinks from the one or more user equipment 114 to a respective tower. As may be appreciated, a continuous high packet count per second (e.g., fifty packets per second or higher) can be understood by the server computer 102 as reflecting a high noise level (e.g., multiple user equipment 114 connecting to the same tower) while a relatively low packet count per second (e.g., under fifty packets per second) can indicate a low noise level.

If high or low packet counts persist across towers and/or over time, such measures can be interpreted by the server computer 102 (e.g., via execution of the device tracking service 106) as indicating movement of multiple user equipment 114 in unison (or not). In particular, if the same devices experience a high packet count per second over some measure of time and over two or more towers, such indications may be interpreted by the server computer 102 as indicating that these multiple user equipment 114 are moving in unison (and switching from and to the same towers, etc.). Similarly, consistent packet count rates over different towers among multiple user equipment 114 may indicate movements of the respective multiple user equipment 114 in a non-unison manner. It should be understood that these example embodiments are illustrative, and therefore should not be construed as being limiting in any way.

From operation 412, the method 400 can proceed to operation 414. At operation 414, the server computer 102 can determine if multiple instances of user equipment 114 are moving in unison. In some embodiments, the server computer 102 can determine if multiple user equipment 114 are moving in unison by determining movements associated with two or more user equipment 114 (and looking for multiple user equipment 114 that have similar and/or consistent and/or identical movements over time) as explained above with reference to operation 412. In some other embodiments, the server computer 102 can be configured to determine, based on analyzing the enriched and/or updated call event data set 108, if cell identifiers, locations, times, and/or other aspects of the call event data set 108 indicate that two or more user equipment 114 are moving together (e.g., that two or more of the user equipment 114 are co-travelling on public transit or the like). Because multiple user equipment 114 can be determined by the server computer 102 to be moving in unison in additional and/or alternative manners, it should be understood that the above example embodiments of operation 414 are illustrative, and therefore should not be construed as being limiting in any way.

If the server computer 102 determines, in operation 414, that two or more user equipment 114 are not moving in unison (i.e., that two or more user equipment 114 are not co-travelling on public transit), the method 400 can proceed to operation 416. At operation 416, the server computer 102 can determine if a microrecord 124 is to be published by the server computer 102. As explained above, the microrecord 124 can include data that can capture one or more movements of one or more user equipment 114 (although not in unison as can be understood based on the description of operation 414). It should be understood that this example embodiment is illustrative, and therefore should not be construed as being limiting in any way.

If the server computer 102 determines, in operation 414, that two or more user equipment 114 are moving in unison (e.g., that two or more user equipment 114 are co-travelling on public transit or the like), the method 400 can proceed to operation 418. At operation 418, the server computer 102 can determine if a macrorecord 126 is to be published by the server computer 102. As explained above, the macrorecord 126 can include data that can capture movements of the two or more user equipment 114 that are determined to be moving in unison (e.g., co-travelling on public transit, or the like). It should be understood that this example embodiment is illustrative, and therefore should not be construed as being limiting in any way.

Returning to operation 416, if the server computer 102 determines, in operation 416 that a microrecord 124 is to be published by the server computer 102, the method 400 can proceed to operation 420. At operation 420, the server computer 102 can publish one or more microrecord(s) 124, which as noted above can capture movements associated with one or more user equipment 114 that are not moving in unison. In operation 420, the server computer 102 also can update the call event data set 108 with the movements identified in operation 412 (for the respective user equipment 114), and the updated call event data set 108 can be stored by the server computer 102 (e.g., in a local data storage or cache, a remote data storage or cache, or the like). It should be understood that this example embodiment is illustrative, and therefore should not be construed as being limiting in any way.

From operation 420, the method 400 can proceed to operation 422. The method 400 also can proceed to operation 422 from operation 416 if the server computer 102 determines, in operation 416, that no microrecord 124 is to be published. At operation 422, the server computer 102 can determine if the call (during which the movement identified in operation 412 occurred) has ended (or not). If the server computer 102 determines, in operation 422, that call has not ended, the method 400 can return to operation 402, and the flow of the method 400 from operation 402 can be reiterated.

Returning now to operation 418, if the server computer 102 determines, in operation 418 that a macrorecord 126 is not to be published, the method 400 can proceed to operation 422 as described immediately below. If the server computer 102 determines, in operation 418, that a macrorecord 126 is to be published by the server computer 102, the method 400 can proceed to operation 424. At operation 424, the server computer 102 can publish a macrorecord 126, which as noted above can capture movements associated with two or more user equipment 114 that are moving in unison (e.g., two or more user equipment 114 that are travelling together on public transit or the like). In operation 424, the server computer 102 also can clear the cache (e.g., clear the stored version of the call event data set 108) and remove any other call event data set 108 that may be stored by the server computer 102 (e.g., in a local data storage or cache, a remote data storage or cache, or the like). It should be understood that this example embodiment is illustrative, and therefore should not be construed as being limiting in any way.

From operation 424, the method 400 can proceed to operation 426. The method 400 also can proceed to operation 426 from operation 422 if the server computer 102 determines, in operation 422, that the call (during which the movements identified in operation 412 occurred) has ended. The method 400 can end at operation 426.

Figure 5:
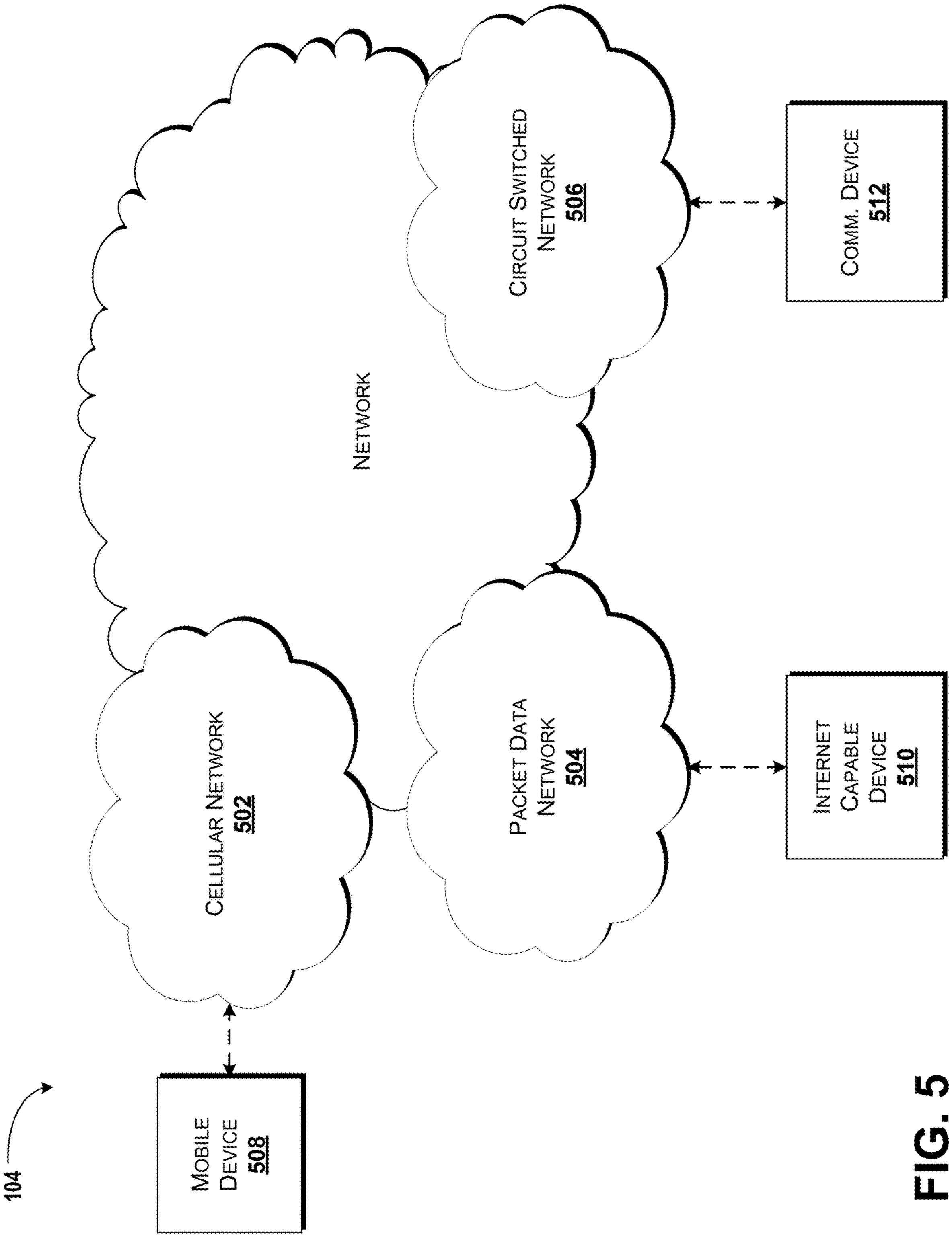
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), NodeB's or eNodeB's ("eNBs"), gNodeBs ("gNBs"), or the like; base station controllers ("BSCs") radio network controllers ("RNCs"), or the like; an evolved packet core ("EPC"); mobile switching centers ("MSCs" or "MSSs"); session management functions ("SMFs); mobile management entities ("MMEs"); access and mobility management functions ("AMFs); authentication server functions ("AUSFs"), network slice selection functions ("NSSFs); network exposure functions ("NEFs"); policy control functions ("PCFs"); and various other functions in the user and control planes such as, for example, user plane functions ("UPFs), application functions ("AFs"), NF repository functions ("NRFs"), and the like; short message service centers ("SMSCs"); multimedia messaging service centers ("MMSCs"); home location registers ("HLRs"); home subscriber servers ("HSSs"); visitor location registers ("VLRs"); charging platforms; billing platforms; voicemail platforms; GPRS core network components; links to data networks ("DNs") and/or other operator services, third party services, and/or the Internet; location service nodes, an IP Multimedia Subsystem ("IMS"); and the like. Of course, the cellular network 502 also can include various interfaces between various components, as is generally understood. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards, 5G mobile communications standards, 6G mobile communication standards, other mobile communications standards, and evolved and future mobile communications standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
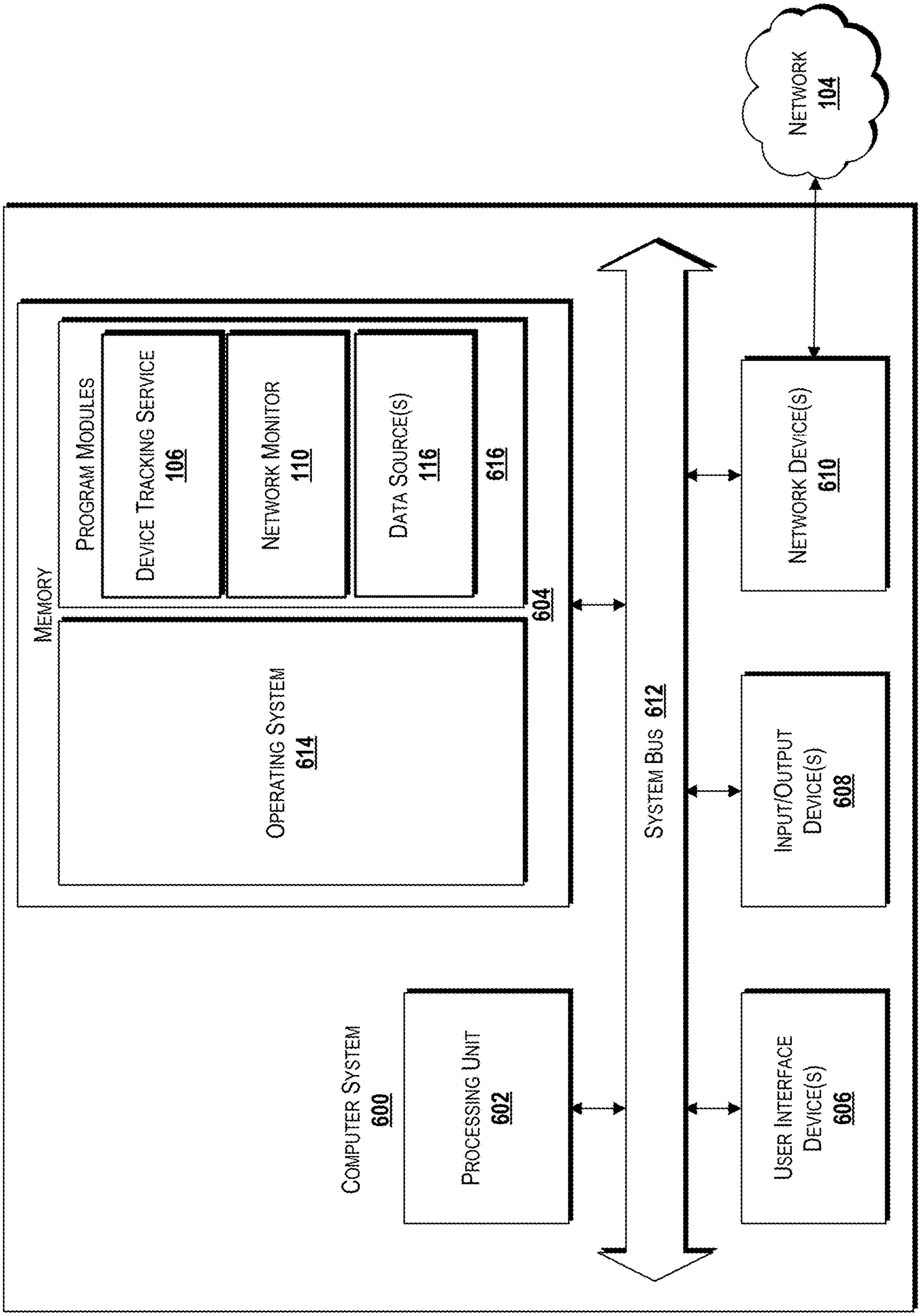
FIG. 6 is a block diagram illustrating an example computer system configured to provide and/or interact with a device tracking service, according to some illustrative embodiments of the concepts and technologies described herein.

FIG. 6 is a block diagram illustrating a computer system 600 configured to provide the functionality described herein for a device tracking service, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The system bus 612 can enable bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or SONOMA families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 can include the device tracking service 106 and/or the network monitor 110. These and/or other programs can be embodied in computer-readable media containing instructions that, when executed by the processing unit 602, perform the method 400 and/or portions thereof described in detail above with respect to FIG. 4 and/or other functionality as illustrated and described herein. It can be appreciated that, at least by virtue of the instructions embodying the method 400 and/or other functionality illustrated and described herein being stored in the memory 604 and/or accessed and/or executed by the processing unit 602, the computer system 600 is a special-purpose computing system that can facilitate providing the functionality illustrated and described herein. According to embodiments, the program modules 616 may be embodied in hardware, software, firmware, or any combination thereof. Although not shown in FIG. 6, it should be understood that the memory 604 also can be configured to store the call event data set 108, the transit data 118, the network topology data 120, the records 122, the microrecords 124, the macrorecords 126, the device tracking log 128, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
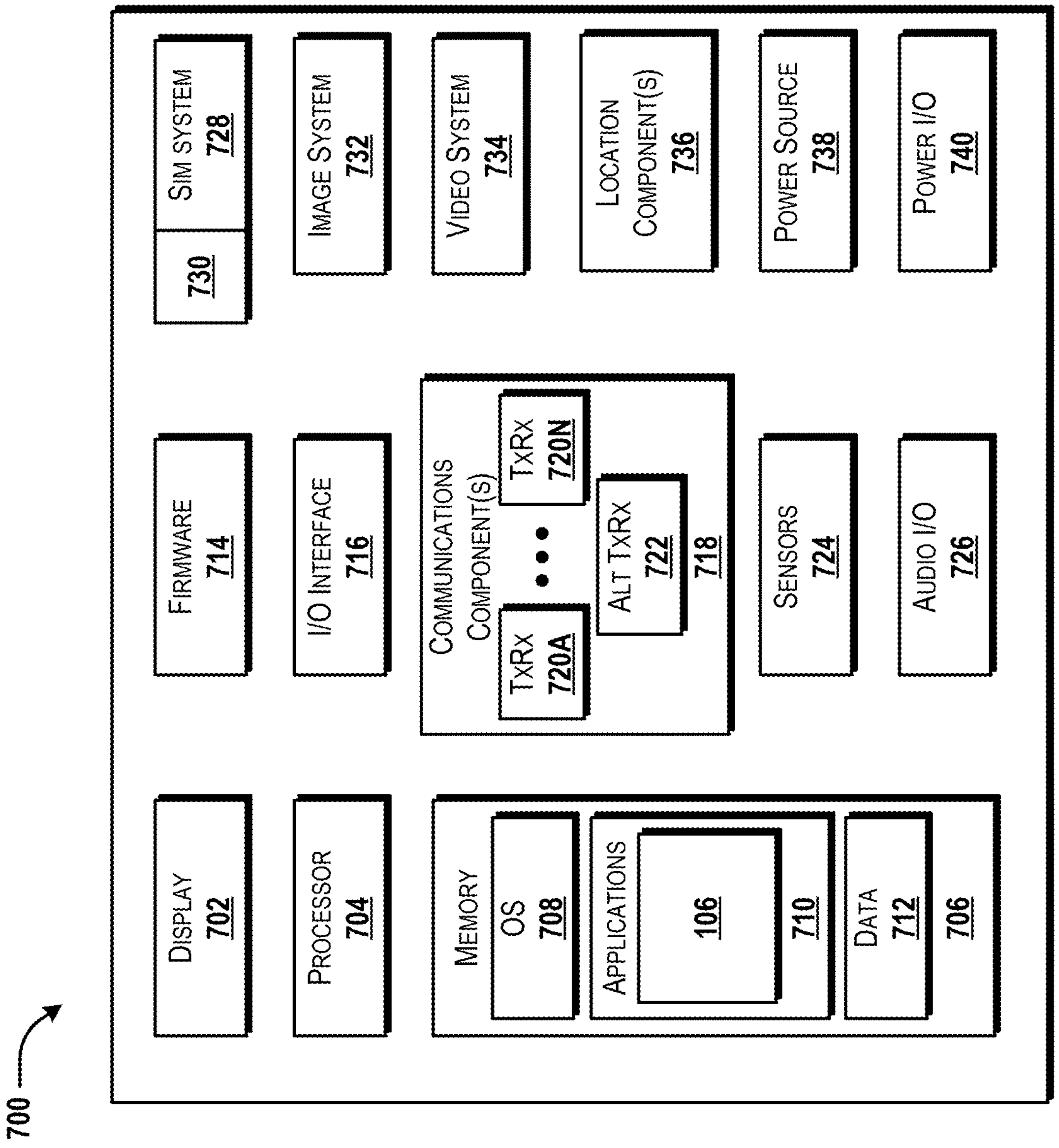
FIG. 7 is a block diagram illustrating an example mobile device configured to interact with a device tracking service, according to some illustrative embodiments of the concepts and technologies described herein.

Turning now to FIG. 7, an illustrative mobile device 700 and components thereof will be described. In some embodiments, the user equipment 114 and/or the user device 132 described above with reference to FIG. 1 can be configured as and/or can have an architecture similar or identical to the mobile device 700 described herein in FIG. 7. It should be understood, however, that the user equipment 114 and/or the user device 132 may or may not include the functionality described herein with reference to FIG. 7. While connections are not shown between the various components illustrated in FIG. 7, it should be understood that some, none, or all of the components illustrated in FIG. 7 can be configured to interact with one another to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements such as, for example, text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710, other computer-executable instructions stored in a memory 706, or the like. In some embodiments, the applications 710 also can include a UI application (not illustrated in FIG. 7).

The UI application can interface with the operating system 708 to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, configuring settings, manipulating address book content and/or settings, multi-mode interaction, interacting with other applications 710, and otherwise facilitating user interaction with the operating system 708, the applications 710, and/or other types or instances of data 712 that can be stored at the mobile device 700. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704.

It can be appreciated that, at least by virtue of storage of the instructions corresponding to the applications 710 and/or other instructions embodying other functionality illustrated and described herein in the memory 706, and/or by virtue of the instructions corresponding to the applications 710 and/or other instructions embodying other functionality illustrated and described herein being accessed and/or executed by the processor 704, the mobile device 700 is a special-purpose mobile device that can facilitate providing the functionality illustrated and described herein. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, call information, location information, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, 5G, 6G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system ("image system") 732. The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Figure 8:
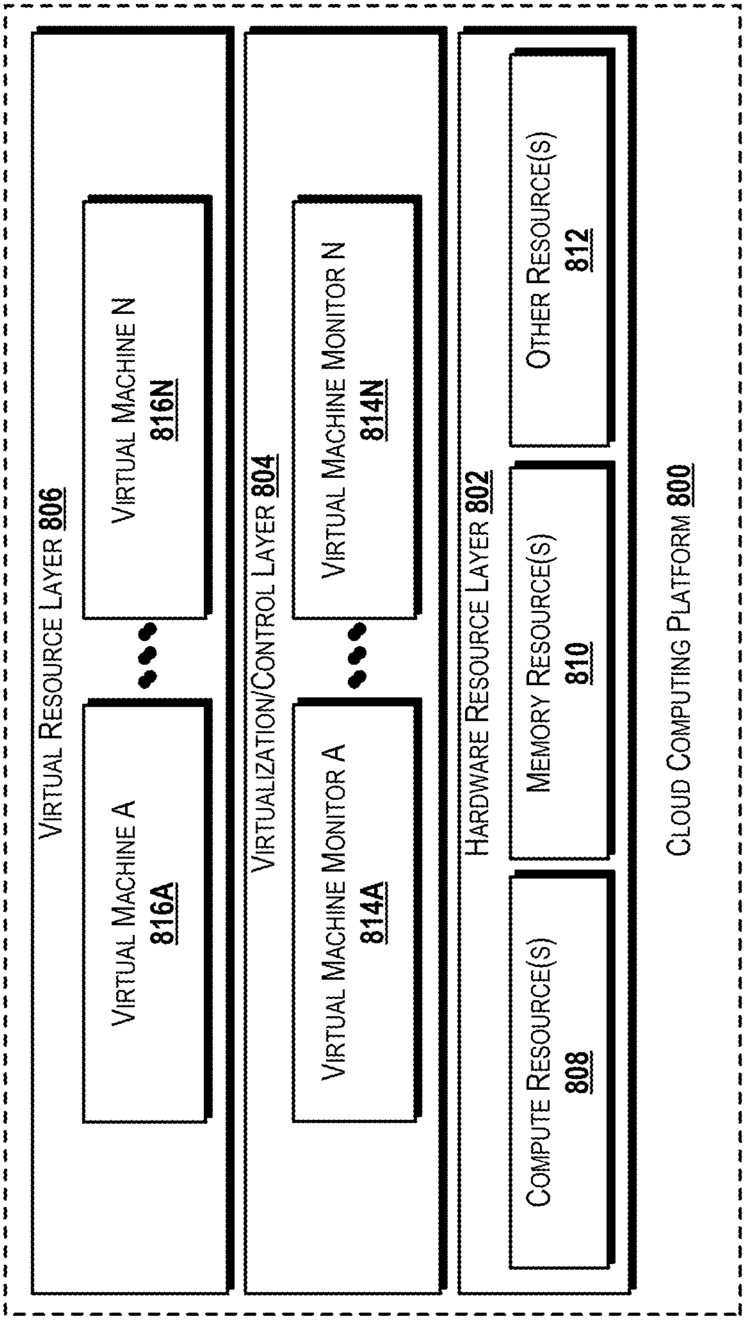
FIG. 8 is a diagram illustrating a computing environment capable of implementing aspects of the concepts and technologies disclosed herein, according to some illustrative embodiments of the concepts and technologies described herein.

FIG. 8 illustrates an illustrative architecture for a cloud computing platform 800 that can be capable of executing the software components described herein for a device tracking service 106, the network monitor 110, the data sources 116, the data store 130, the user device 132, and/or for interacting with the device tracking service 106, the network monitor 110, the data sources 116, the data store 130, the user device 132, and/or other entities. Thus, it can be appreciated that in some embodiments of the concepts and technologies disclosed herein, the cloud computing platform 800 illustrated in FIG. 8 can be used to provide the functionality described herein with respect to the server computer 102, the network monitor 110, the data sources 116, the data store 130, and/or the user device 132.

The cloud computing platform 800 thus may be utilized to execute any aspects of the software components presented herein. Thus, according to various embodiments of the concepts and technologies disclosed herein, the device tracking service 106, the network monitor 110, the data sources 116, the data store 130, and/or the user device 132 can be implemented, at least in part, on or by elements included in the cloud computing platform 800 illustrated and described herein. Those skilled in the art will appreciate that the illustrated cloud computing platform 800 is a simplification of but only one possible implementation of an illustrative cloud computing platform, and as such, the illustrated cloud computing platform 800 should not be construed as being limiting in any way.

In the illustrated embodiment, the cloud computing platform 800 can include a hardware resource layer 802, a virtualization/control layer 804, and a virtual resource layer 806. These layers and/or other layers can be configured to cooperate with each other and/or other elements of a cloud computing platform 800 to perform operations as will be described in detail herein. While connections are shown between some of the components illustrated in FIG. 8, it should be understood that some, none, or all of the components illustrated in FIG. 8 can be configured to interact with one another to carry out various functions described herein. In some embodiments, the components are arranged so as to communicate via one or more networks such as, for example, the network 104 illustrated and described hereinabove (not shown in FIG. 8). Thus, it should be understood that FIG. 8 and the following description are intended to provide a general understanding of a suitable environment in which various aspects of embodiments can be implemented, and should not be construed as being limiting in any way.

The hardware resource layer 802 can provide hardware resources. In the illustrated embodiment, the hardware resources can include one or more compute resources 808, one or more memory resources 810, and one or more other resources 812. The compute resource(s) 808 can include one or more hardware components that can perform computations to process data, and/or to execute computer-executable instructions of one or more application programs, operating systems, services, and/or other software including, but not limited to, the device tracking service 106, the network monitor 110, the data sources 116, and/or other entities illustrated and described herein.

According to various embodiments, the compute resources 808 can include one or more central processing units ("CPUs"). The CPUs can be configured with one or more processing cores. In some embodiments, the compute resources 808 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 808 can include one or more discrete GPUs. In some other embodiments, the compute resources 808 can include one or more CPU and/or GPU components that can be configured in accordance with a co-processing CPU/GPU computing model. Thus, it can be appreciated that in some embodiments of the compute resources 808, a sequential part of an application can execute on a CPU and a computationally-intensive part of the application can be accelerated by the GPU. It should be understood that this example is illustrative, and therefore should not be construed as being limiting in any way.

In some embodiments, the compute resources 808 also can include one or more system on a chip ("SoC") components. It should be understood that an SoC component can operate in association with one or more other components as illustrated and described herein, for example, one or more of the memory resources 810 and/or one or more of the other resources 812. In some embodiments in which an SoC component is included, the compute resources 808 can be or can include one or more embodiments of the SNAPDRAGON brand family of SoCs, available from QUALCOMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 808 can be or can include one or more hardware components arranged in accordance with an ARM architecture, available for license from ARM HOLDINGS of Cambridge, United Kingdom. Alternatively, the compute resources 808 can be or can include one or more hardware components arranged in accordance with an x86 architecture, such as an architecture available from INTEL CORPORATION of Mountain View, California, and others. Those skilled in the art will appreciate the implementation of the compute resources 808 can utilize various computation architectures and/or processing architectures. As such, the various example embodiments of the compute resources 808 as mentioned hereinabove should not be construed as being limiting in any way. Rather, implementations of embodiments of the concepts and technologies disclosed herein can be implemented using compute resources 808 having any of the particular computation architecture and/or combination of computation architectures mentioned herein as well as other architectures.

Although not separately illustrated in FIG. 8, it should be understood that the compute resources 808 illustrated and described herein can host and/or execute various services, applications, portals, and/or other functionality illustrated and described herein. Thus, the compute resources 808 can host and/or can execute the device tracking service 106, the network monitor 110, the data sources 116, the data store 130, and user device 132, or other applications or services illustrated and described herein.

The memory resource(s) 810 can include one or more hardware components that can perform or provide storage operations, including temporary and/or permanent storage operations. In some embodiments, the memory resource(s) 810 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 808, subject to the definition of "computer storage media" provided above (e.g., as excluding waves and signals per se and/or communication media as defined in this application).

Although not illustrated in FIG. 8, it should be understood that the memory resources 810 can host or store the various data illustrated and described herein including, but not limited to, the call event data set 108, the transit data 118, the network topology data 120, and/or other data, if desired. It should be understood that this example is illustrative, and therefore should not be construed as being limiting in any way.

The other resource(s) 812 can include any other hardware resources that can be utilized by the compute resources(s) 808 and/or the memory resource(s) 810 to perform operations. The other resource(s) 812 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 802 can be virtualized by one or more virtual machine monitors ("VMMs") 814A-814N (also known as "hypervisors;" hereinafter "VMMs 814"). The VMMs 814 can operate within the virtualization/control layer 804 to manage one or more virtual resources that can reside in the virtual resource layer 806. The VMMs 814 can be or can include software, firmware, and/or hardware that alone or in combination with other software, firmware, and/or hardware, can manage one or more virtual resources operating within the virtual resource layer 806.

The virtual resources operating within the virtual resource layer 806 can include abstractions of at least a portion of the compute resources 808, the memory resources 810, the other resources 812, or any combination thereof. These abstractions are referred to herein as virtual machines ("VMs"). In the illustrated embodiment, the virtual resource layer 806 includes VMs 816A-816N (hereinafter "VMs 816").

Based on the foregoing, it should be appreciated that systems and methods for providing and using a device tracking service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:

a processor; and a memory that stores computer-executable instructions that, when executed by the processor, cause the processor to perform operations comprising obtaining, from a network monitor that accesses an interface of a network, a call event data set comprising data that defines call events associated with a plurality of instances of user equipment, obtaining, from a data source, transit data that defines geographic locations and routes associated with public transit and network topology data that defines geographic locations of network infrastructure associated with the network, identifying, based on the call event data set, the transit data, and the network topology data, a plurality of movements associated with the plurality of instances of user equipment, determining, based on the plurality of movements, if two or more of the plurality of instances of user equipment are moving in unison, in response to a determination that the two or more of the plurality of instances of user equipment are moving in unison, publishing a macrorecord to a device tracking log, the macrorecord including a count of the two or more of the plurality of instances of user equipment, an average speed of the two or more of the plurality of instances of user equipment, and a travel mode associated with the two or more of the plurality of instances of user equipment, and in response to a determination that the two or more of the plurality of instances of user equipment are not moving in unison, updating the call event data set with information that defines a device identifier, a type of device, the travel mode, and a geographic location associated with at least one of the plurality of instances of user equipment.

2. The system of claim 1, wherein the network monitor comprises a network probe, and wherein the interface of the network comprises an S1 interface or an N11 interface.

3. The system of claim 1, wherein determining if the two or more of the plurality of instances of user equipment are moving in unison comprises:

determining, based on the transit data, the network topology data, and the call event data set, that a first of the two or more of the plurality of instances of user equipment has movements over time that are substantially similar to further movements of a second of the two or more of the plurality of instances of user equipment over the time.

4. The system of claim 1, wherein identifying the plurality of movements comprises:

analyzing the call event data set to identify devices that are making telephone calls, wherein the devices comprise the two or more of the plurality of instances of user equipment;

analyzing, for each of the two or more of the plurality of instances of user equipment, a plurality of general packet radio service tunneling protocol messages comprising indications of geographic location; and determining, based on the plurality of general packet radio service tunneling protocol messages, a change in the geographic location, a speed, and a direction of movement for each of the two or more of the plurality of instances of user equipment.

5. The system of claim 4, wherein identifying the devices that are making the telephone calls comprises analyzing the call event data set to determine, based on access point names and quality of service class identifiers that are equal to one, the devices associated with the call event data set.

6. The system of claim 1, wherein the computer-executable instructions, when executed by the processor, cause the processor to perform operations further comprising:

in response to the determination that the two or more of the plurality of instances of user equipment are not moving in unison, publishing a microrecord to the device tracking log, wherein the microrecord comprises further data that defines the device identifier, the type of device, the travel mode, and the geographic location associated with at least one of the plurality of instances of user equipment.

7. The system of claim 1, wherein the travel mode comprises the public transit.

8. A method comprising:

obtaining, by a computer comprising a processor and from a network monitor that accesses an interface of a network, a call event data set comprising data that defines call events associated with a plurality of instances of user equipment;

obtaining, by the processor and from a data source, transit data that defines geographic locations and routes associated with public transit and network topology data that defines geographic locations of network infrastructure associated with the network;

identifying, by the processor and based on the call event data set, the transit data, and the network topology data, a plurality of movements associated with the plurality of instances of user equipment;

determining, by the processor and based on the plurality of movements, if two or more of the plurality of instances of user equipment are moving in unison;

in response to a determination that the two or more of the plurality of instances of user equipment are moving in unison, publishing, by the processor, a macrorecord to a device tracking log, the macrorecord including a count of the two or more of the plurality of instances of user equipment, an average speed of the two or more of the plurality of instances of user equipment, and a travel mode associated with the two or more of the plurality of instances of user equipment; and in response to a determination that the two or more of the plurality of instances of user equipment are not moving in unison, updating, by the processor, the call event data set with information that defines a device identifier, a type of device, the travel mode, and a geographic location associated with at least one of the plurality of instances of user equipment.

9. The method of claim 8, wherein the network monitor comprises a network probe, and wherein the interface of the network comprises an S1 interface or an N11 interface.

10. The method of claim 8, wherein determining if the two or more of the plurality of instances of user equipment are moving in unison comprises:

determining, based on the transit data, the network topology data, and the call event data set, that a first of the two or more of the plurality of instances of user equipment has movements over time that are substantially similar to further movements of a second of the two or more of the plurality of instances of user equipment over the time.

11. The method of claim 8, wherein identifying the plurality of movements comprises:

analyzing the call event data set to identify devices that are making telephone calls, wherein the devices comprise the two or more of the plurality of instances of user equipment;

analyzing, for each of the two or more of the plurality of instances of user equipment, a plurality of general packet radio service tunneling protocol messages comprising indications of geographic location; and determining, based on the plurality of general packet radio service tunneling protocol messages, a change in the geographic location, a speed, and a direction of movement for each of the two or more of the plurality of instances of user equipment.

12. The method of claim 11, wherein identifying the devices that are making the telephone calls comprises analyzing the call event data set to determine, based on access point names and quality of service class identifiers that are equal to one, the devices associated with the call event data set.

13. The method of claim 8, further comprising:

in response to the determination that the two or more of the plurality of instances of user equipment are not moving in unison, publishing a microrecord to the device tracking log, wherein the microrecord comprises further data that defines the device identifier, the type of device, the travel mode, and the geographic location associated with at least one of the plurality of instances of user equipment.

14. A computer storage medium having computer-executable instructions stored thereon that, when executed by a processor, cause the processor to perform operations comprising:

obtaining, from a network monitor that accesses an interface of a network, a call event data set comprising data that defines call events associated with a plurality of instances of user equipment;

obtaining, from a data source, transit data that defines geographic locations and routes associated with public transit and network topology data that defines geographic locations of network infrastructure associated with the network;

identifying, based on the call event data set, the transit data, and the network topology data, a plurality of movements associated with the plurality of instances of user equipment;

determining, based on the plurality of movements, if two or more of the plurality of instances of user equipment are moving in unison;

in response to a determination that the two or more of the plurality of instances of user equipment are moving in unison, publishing a macrorecord to a device tracking log, the macrorecord including a count of the two or more of the plurality of instances of user equipment, an average speed of the two or more of the plurality of instances of user equipment, and a travel mode associated with the two or more of the plurality of instances of user equipment; and in response to a determination that the two or more of the plurality of instances of user equipment are not moving in unison, updating the call event data set with information that defines a device identifier, a type of device, the travel mode, and a geographic location associated with at least one of the plurality of instances of user equipment.

15. The computer storage medium of claim 14, wherein the network monitor comprises a network probe, and wherein the interface of the network comprises an S1 interface or an N11 interface.

16. The computer storage medium of claim 14, wherein determining if the two or more of the plurality of instances of user equipment are moving in unison comprises:

determining, based on the transit data, the network topology data, and the call event data set, that a first of the two or more of the plurality of instances of user equipment has movements over time that are substantially similar to further movements of a second of the two or more of the plurality of instances of user equipment over the time.

17. The computer storage medium of claim 14, wherein identifying the plurality of movements comprises:

analyzing the call event data set to identify devices that are making telephone calls, wherein the devices comprise the two or more of the plurality of instances of user equipment;

analyzing, for each of the two or more of the plurality of instances of user equipment, a plurality of general packet radio service tunneling protocol messages comprising indications of geographic location; and determining, based on the plurality of general packet radio service tunneling protocol messages, a change in the geographic location, a speed, and a direction of movement for each of the two or more of the plurality of instances of user equipment.

18. The computer storage medium of claim 17, wherein identifying the devices that are making the telephone calls comprises analyzing the call event data set to determine, based on access point names and quality of service class identifiers that are equal to one, the devices associated with the call event data set.

19. The computer storage medium of claim 14, wherein the computer-executable instructions, when executed by the processor, cause the processor to perform operations further comprising:

in response to the determination that the two or more of the plurality of instances of user equipment are not moving in unison, publishing a microrecord to the device tracking log, wherein the microrecord comprises further data that defines the device identifier, the type of device, the travel mode, and the geographic location associated with at least one of the plurality of instances of user equipment.

20. The computer storage medium of claim 14, wherein the travel mode comprises the public transit.

* * * * *